(12) United States Patent
Pytlik et al.

(10) Patent No.: US 9,231,281 B2
(45) Date of Patent: Jan. 5, 2016

(54) BUTTON CELL COMPRISING A COIL ELECTRODE WITH A THERMAL FUSE

(75) Inventors: Eduard Pytlik, Ellwangen (DE); Winfried Gaugler, Ellwangen (DE)

(73) Assignee: VARTA Microbattery GmbH (DE)

( * ) Notice: Subject to any disclaimer, the term of this patent is extended or adjusted under 35 U.S.C. 154(b) by 364 days.

(21) Appl. No.: 13/813,564

(22) PCT Filed: Jul. 28, 2011

(86) PCT No.: PCT/EP2011/062973
§ 371 (c)(1),
(2), (4) Date: Jan. 31, 2013

(87) PCT Pub. No.: WO2012/016901
PCT Pub. Date: Feb. 9, 2012

(65) Prior Publication Data
US 2013/0130066 A1   May 23, 2013

(30) Foreign Application Priority Data
Aug. 3, 2010   (DE) .......................... 10 2010 033 577

(51) Int. Cl.
*H01M 10/42* (2006.01)
*H01M 2/02* (2006.01)
*H01M 2/34* (2006.01)
H01M 10/0525 (2010.01)

(52) U.S. Cl.
CPC .......... *H01M 10/425* (2013.01); *H01M 2/0222* (2013.01); *H01M 2/34* (2013.01); *H01M 10/0525* (2013.01); *H01M 2200/00* (2013.01); *H01M 2200/103* (2013.01); *H01M 2200/106* (2013.01)

(58) Field of Classification Search
CPC ............ H01M 10/285; H01M 10/283; H01M 10/425; H01M 10/0525; H01M 2/0222; H01M 2/34; H01M 2200/10; H01M 2200/103; H01M 2200/106
See application file for complete search history.

(56) References Cited

U.S. PATENT DOCUMENTS

| 6,265,100 B1 | 7/2001 | Saaski et al. |
| 8,586,232 B2* | 11/2013 | Brenner ........................ 429/174 |
| 2009/0186263 A1 | 7/2009 | Pozin et al. |
| 2011/0086253 A1* | 4/2011 | Pompetzki et al. ............. 429/62 |
| 2011/0200871 A1 | 8/2011 | Pytlik et al. |

FOREIGN PATENT DOCUMENTS

| DE | 31 13 309 A1 | 10/1982 |
| DE | 36 38 793 A1 | 5/1988 |
| DE | 196 07 901 A1 | 9/1996 |
| DE | 196 47 593 A1 | 5/1998 |
| DE | 102 50 857 A1 | 5/2004 |
| DE | 10 2008 018 172 | 10/2009 |
| DE | 10 2009 017 514 A1 | 10/2010 |

(Continued)

Primary Examiner — Raymond Alejandro
(74) Attorney, Agent, or Firm — DLA Piper LLP (US)

(57) ABSTRACT

A button cell closed without flanging includes a housing formed of two housing halves including a cell cup and a cell lid, an electrically insulating seal separating the cell cup and the cell lid, an electrode-separator assembly including at least one positive and at least one negative electrode arranged inside the housing, metal diverters electrically connecting the at least one positive and the at least one negative electrode to the housing halves, and a thermal fuse connected to or integrated into one of the diverters.

7 Claims, 2 Drawing Sheets

(56) References Cited

FOREIGN PATENT DOCUMENTS

| | | | | |
|---|---|---|---|---|
| DE | 10-2009-017514 | * 10/2010 | ............. | H01M 2/02 |
| EP | 0 981 173 A1 | 2/2000 | | |
| EP | 1 406 325 A1 | 4/2004 | | |
| EP | 1 508 928 A2 | 2/2005 | | |
| EP | 2 006 940 A1 | 12/2008 | | |
| JP | 2007-294111 A | 11/2007 | | |
| JP | 2008-262825 A | 10/2008 | | |
| WO | WO 2009/127396 | * 10/2009 | ............ | H01M 10/50 |
| WO | 2009/150791 A1 | 12/2009 | | |
| WO | WO 2009/150791 | * 12/2009 | ............ | H01M 10/40 |

* cited by examiner (A)

(B)

BUTTON CELL COMPRISING A COIL ELECTRODE WITH A THERMAL FUSE

RELATED APPLICATIONS

This is a §371 of International Application No. PCT/EP2011/062973, with an international filing date of Jul. 28, 2011 (WO 2012/016901 A1, published Feb. 9, 2012), which is based on German Patent Application No. 10 2010 033 577.0, filed Aug. 3, 2010, the subject matter of which is incorporated herein by reference.

TECHNICAL FIELD

This disclosure relates to button cells with a housing comprising two metal housing halves, which housing includes an electrode-separator assembly.

BACKGROUND

Button cells usually have a housing comprising two housing halves, a cell cup and a cell lid. These can be produced, for example, from nickel-plated deep-drawn metal sheets as punch-drawn parts. The cell cup usually forms the positive pole, the cell lid forms the negative pole. Such a housing can contain a wide variety of electro-chemical systems, for example, zinc/manganese dioxide, primary and secondary lithium systems or secondary systems such as nickel/cadmium or nickel/metal hydride.

The liquid-tight closure of such button cells is typically effected by flanging the edge of the cell cup over the edge of the cell lid in connection with a plastic ring arranged between the cell cup and the cell lid which simultaneously serves as a sealing element as well as for electrical insulation of the cell cup and of the cell lid. Such button cells are described, for example, in DE 31 13 309.

As an alternative, it is also possible to produce button cells where, in the axial direction, the cell cup and the cell lid are exclusively held together only by a force-fit connection and which correspondingly do not have a flanged cup edge. Such button cells as well as a method for producing the same have been described, for example, in DE 10 2009 017 514.

Regardless of the various advantages that can be provided by button cells not having such flanging, they are yet less stress resistant in the axial direction than comparable button cells having a flanged cup edge, in particular in terms of axial mechanical loads which can be due to reasons in the interior of the button cell. For example, the electrodes of rechargeable lithium-ion systems are always subject to volume changes during charging and discharging processes. The axial forces involved naturally tend to cause leaks comparatively more likely in the case of button cells without a flanging than in the case of button cells with a flanging.

Windings consisting of flat electrode and separator layers can be produced quite easy according to known methods (e.g., see DE 36 38 793), for example, by applying, in particular laminating, the electrodes in a planar manner, particularly in the form of strips, onto a separator present as an endless sheet. Generally, the assembly composed of electrode and separator is wound up onto a so-called "winding mandrel." After stripping the winding off the mandrel, an axial cavity remains in the center of the winding with the result that the winding can possibly relax into the cavity. The result thereof can be problems in electrical contacting of the electrodes and the metal housing halves.

Severe safety problems can occur in the case of lithium-ion or lithium-polymer cells, for example, caused by current pulses as can be caused by an external short-circuit, or by overcharging. Lithium-ion cells often include a graphite-containing anode and a lithium-cobalt-oxide-based cathode. During charging, lithium ions are released from the lithium-cobalt-oxide and intercalated into the graphite layers of the anode. If such a cell is overcharged, in particular to a voltage of more than 4.2 V, it is possible that more lithium ions are released than can be taken up by the graphite layers of the anode. As a result, highly reactive metallic lithium precipitates on the surface of the anode. If the charging process is further continued and the voltage is correspondingly further increased, in particular to a level significantly higher than 4.2 V, parts of the electrolyte in the cell may decompose and result in gas evolution. Furthermore, the lithium-cobalt-oxide structure becomes more and more instable due to the progressing release of the lithium until it finally breaks down by releasing oxidants (oxygen). Under certain conditions, these processes may lead to a significant heating of the cell which can result in an explosive combustion.

SUMMARY

We provide a button cell closed without flanging including a housing formed of two housing halves including a cell cup and a cell lid, an electrically insulating seal separating the cell cup and the cell lid, an electrode-separator assembly including at least one positive and at least one negative electrode arranged inside the housing, metal diverters electrically connecting the at least one positive and the at least one negative electrode to the housing halves, and a thermal fuse connected to or integrated into one of the diverters.

We also provide a button cell including two metal housing halves separated from one another by an electrically insulating seal and which form a housing having a substantially planar bottom region and a planar lid region parallel thereto, an electrode-separator assembly having at least one positive and at least one negative electrode within the housing, wherein the assembly is a winding whose end face sides point in a direction of the planar bottom region and the planar lid region, and metal diverters which electrically connect the at least one positive and the at least one negative electrode to in each case one of the housing halves, wherein at least one of the diverters is provided with a thermal fuse.

DETAILED DESCRIPTION

Figure 1:
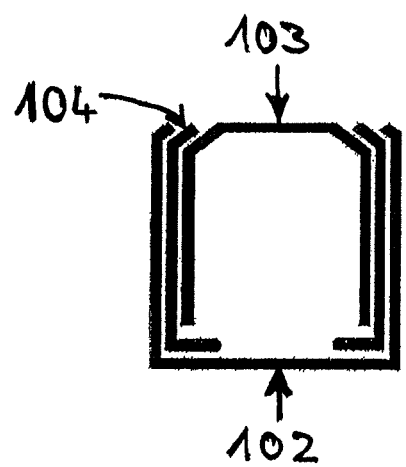
FIG. 1A schematically shows the cross section cross section of a housing for a button cell having a flanged cup edge.
FIG. 1B schematically shows the cross section of a housing for a button cell without flanging.
Figure 1:
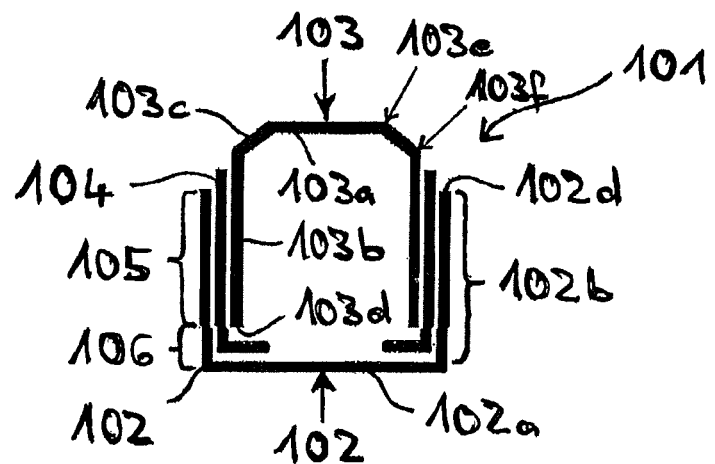

We provide a button cell which is particularly well-protected against the above-mentioned axial mechanical loads and which furthermore provides additional safety features protecting the cell against damages caused by overcharging or short circuits.

Our button cells comprise two metal housing halves separated from one another by an electrically insulating seal and which form a housing having a planar bottom region and planar lid region parallel to the bottom region. The two housing halves are, as already mentioned above, usually a so-called "cell cup" and a cell lid. In particular, nickel-plated steel or sheet metal are preferred as materials for the housing halves. Further suitable metal materials are, in particular, tri-metals, for example, with the sequence nickel, steel (or stainless steel) and copper (where the nickel layer preferably forms the outer face of the button cell housing and the copper layer preferably forms the inner face of the button cell housing).

For example, an injection-molded sealing or a foil sealing can be used as a sealing. The latter, for example, are described in DE 196 47 593.

At least one positive and at least one negative electrode are arranged in the housing, namely flat electrode layers. The electrodes are preferably connected to one another by at least one flat separator. The electrodes are preferably laminated or bonded to the separator. In general, the thickness of each of the electrodes and the separator are not more than in the micrometer (μm) range. Generally, a porous plastic film is used as a separator.

Preferably, our button cell has at least one lithium intercalating electrode. Correspondingly, preferably, at least one of the electrodes is a lithium intercalating electrode. Thus, the cell is preferably a lithium-ion or lithium-polymer cell.

The assembly consisting of electrodes and at least one flat separator such as a winding or coil, particularly a spiral winding, are positioned in the housing of a button cell, the winding arranged such that the end face sides thereof are oriented in the direction of the planar bottom region and the planar lid region of the housing.

Besides the housing halves and the electrode-separator assembly, the button cell comprises additional metal diverters electrically connecting the at least one positive and/or the at least one negative electrode in each case to one of the housing halves. Preferably, the diverter(s) connected to the at least one positive electrode consist(s) of aluminum. Preferably, the diverter(s) connected to the at least one negative electrode consist(s) of nickel or copper.

On the side of the electrodes, the diverters preferably connect to current collectors. Generally, these collectors are metal foils or nets which are usually coated with electrode active material on both sides. On the side of the positive electrode, these current collectors preferably consist of aluminum, on the side of the negative electrode preferably of nickel or copper. The foils or nets particularly have a thickness of 1 μm to 100 μm. Connection of the diverters to the current collectors is preferably effected by welding.

The electrode-separator assembly preferably has the layer sequence
  negative electrode/separator/positive electrode/separator or the layer sequence
  positive electrode/separator/negative electrode/separator.
Besides that, there can also be assemblies preferred having the layer sequences
  negative electrode/separator/positive electrode/separator/ negative electrode or
  positive electrode/separator/negative electrode/separator/ positive electrode.

In these cases, the assembly has more than one positive and/or more than one negative electrode.

For example, the at least one positive electrode can comprise lithium cobalt oxide as an active material. Graphite, for example, may be suitable as an active material for the at least one negative electrode. Generally, the separator consists of a preferably porous plastic material, for example, a polyolefin.

Furthermore, the cell preferably also has an electrolyte, for example, an alkaline electrolyte or an organic electrolyte, in particular on a carbonate basis (if the cell is a lithium-ion cell).

The button cell is characterized in that at least one of the diverters is provided with a thermal fuse. In contrast to an electrical fuse, such a thermal fuse is not triggered due to the current flowing through it, but exclusively caused by temperature. If a cell is overcharged, for example, the thermal fuse responds to the heat produced during overcharging and by opening the current circuit. Then, further overcharging is no longer possible.

The thermal fuse may be a reversibly triggering or even an irreversibly triggering fuse. Reversible fuses have the advantage that the cell does not become inoperative if the fuse is activated. After the cell has returned to a temperature below the activation temperature of the reversible thermal fuse, the cell can be put back in service, in general. However, in the case of a reversibly triggering fuse, there is a risk that the cell is again charged beyond a critical point after cooling down and that after several disconnection cycles a point is reached where the above mentioned explosive combustion starts. For that reason, use of an irreversibly triggering thermal fuse instead of a reversibly triggering thermal fuse may be quite advantageous. Once activated, the fuses interrupt the current circuit permanently. Re-operation of a cell that has a triggered irreversible fuse is not possible.

The thermal fuse preferably has a nominal activation temperature of 65° C. to 130° C. Furthermore it is preferred that the thermal fuse has a holding temperature of 60° C. to 70° C. The above mentioned values were in each case determined at a nominal current of 5 C A according to IEC 61960-1.

The nominal activation temperature is the temperature where the thermal fuse changes its conductivity and opens the current circuit. The holding temperature is the maximum temperature where the nominal current flows through the thermal fuse for a predetermined period of time (here: 100 hours) without the fuse being triggered, that is to say changing conductivity to open the current circuit.

It is particularly preferred that the thermal fuse is a fuse based on an alloy, in particular, on the basis of Rose Metal or D'Arcet Metal.

As generally known, Rose Metal is an alloy composed of bismuth, lead and tin. The melting point of the alloy is approximately 98° C. and is thus below the boiling point of water. In detail, Rose Metal consists of 50% bismuth, 25% to 28% lead, 22% to 25% tin and has a density of approximately 9.32 g/cm$^3$. Similar considerations apply to D'Arcet Metal which is also an alloy of bismuth, tin and lead. However, the latter has a slightly lower melting point of approximately 93.75° C.

Preferably, the thermal fuse can be a positive temperature coefficient (PTC) element. Such a PTC element is an example for a reversible fuse. For example, the use of such a PTC element in connection with a lithium-ion cell is disclosed in DE 102 50 857 A1. As described therein, the PTC element can be integrated in an electrically conductive manner into a diverter, for example, by welding or soldering. Preferably, the PTC element is composed of a polymer in which conducting particles are present in a homogenous distribution. The latter is well-conducting at low temperatures since then the conductive particles are in electrically conducting contact to one another. Starting from a temperature specific to each PTC, the polymer swells so that the conductive particles lose their contact. Then, the resistance of the PTC element abruptly rises.

If such a PTC element is integrated into our cell, the electrical performance at low temperatures is completely available during discharging and charging of the cell. However, if the cell is significantly overcharged or short-circuited externally, the heat produced thereby results in an abrupt increase in the electrical resistance.

Preferably, at least one of the diverters is connected by welding to the respective housing halve. Particularly preferably, the diverter(s) is/are welded to the inner face of the housing in the planar bottom or lid region of the housing. With the weld connection, the at least one positive electrode and/or the at least one negative electrode are directly connected to the planar bottom region or the planar lid region of the housing of a button cell via one or more diverters, where, in general, the cell lid is negatively poled and the cell cup is positively poled.

The weld connection of diverters and housing can be effected by a laser, in particular also through the housing wall of the housing halves from the outside. Correspondingly, we thus provide button cells having weld joints and/or weld points that penetrate the housing, in particular starting from the outer side thereof. The operating parameters of the laser should be adjusted to the thickness of the housing as exactly as possible. Performance can, for example, be modulated by variation of the pulse frequency. After all, the laser is merely to ensure a weld connection between the housing and the diverter while further components such as the electrode winding should not be damaged as far as possible.

Suitable lasers are, for example, commercially available fiber lasers, that is to say solid-state lasers where the doped core of fiber glass forms the active medium. The doping element most often used for the laser-active fiber core is erbium. However, for high-performance applications as here, ytterbium and neodymium are more preferred.

Regardless of the fact that lasers of such a type can very precisely be adjusted to the respective housing thickness and diverter dimension, it is nevertheless possible that in individual cases, the intensity of the laser is selected too powerful and that the laser penetrates the housing wall and the diverter. For this reason, it is particularly preferred to effect welding of the diverters and the housing in the portion of the bottom or lid region which limits the axial cavity in the center of the winding on the end face side. If a laser beam penetrates the housing in this region, the winding cannot be damaged. Instead, the laser beam is absorbed by the opposed housing halve or by a winding core which may be arranged in the cavity.

The diverters to be welded should lie against the inner face of the housing as flatly as possible. This can, for example, be ensured by fixing the diverters by an adhesive tape flatly on or to the end face sides of the electrode winding and the at least one planar separator prior to inserting the latter into the housing.

Preferably, the diverters of a button cell are plane diverters, in particular metal foils, particularly preferably rectangular, strip-shaped or band-shaped metal foils. The foils preferably have a thickness of 5 µm to 100 µm.

Preferably, the diverters are separate components which are connected, in particular welded, to the electrodes, in particular to the current collectors within the electrodes. As an alternative, the diverters may also be uncoated sections of a current collector (sectors that do not contain electrode active material), in particular uncoated ends of such a current collector. By kinking these uncoated sections, in particular of the uncoated ends, for example, by 90°, the ends can be connected to the bottom or lid region of the housing of a button cell, for example, by the above mentioned weld connection.

Preferably, at least one portion of the diverter(s) in the bottom or lid region of the housing lies flat against the inner face of the housing halve(s), in particular if the diverters are plane diverters such as foils. Such diverters can form a flat layer between the inner face of the housing halves and an end face side of the electrode winding and thus form a large-area electrical contact to the housing.

The thermal fuse of a button cell may be arranged between one of the electrodes and the corresponding diverter. That way it can, for example, be welded or soldered to the current collector of the positive electrode on the one side and the diverter for the positive electrode on the other side or to the current collector of the negative electrode on the one side and the diverter for the negative electrode on the other side. However, it is naturally also possible to integrate the thermal fuse completely into one of the diverters or to arrange it between one of the diverters and the corresponding housing halve.

Since generally both positive and negative electrodes may be exposed on the end face sides of the electrode winding, a short circuit between the electrodes is to be prevented. Particularly preferably, the button cell therefor comprises at least one separate insulator which inhibits any direct electrical contact between the end face sides of the winding and the diverters, in particular a portion of the diverter(s) lying flat against the inner face of the housing halves. Such an insulator can, for example, be a foil such as a plastic adhesive foil, for example, to cover the side of the diverter(s) facing away from the inner face of the button cell housing.

The electrode winding of a button cell can be produced according to well-known methods such as the one described in DE 36 38 793, according to which electrodes and separators are wound up onto a winding mandrel. After slipping the winding off the winding mandrel, an axial cavity can be present in the center of the winding, preferably a substantially cylindrical axial cavity. In the housing of a button cell, such a cavity is limited on the shell side by the winding and on the end face side by the bottom or lid region of the housing or at least by a portion thereof. It is particularly preferred that the at least one diverter is welded to one of the or the housing halves in one of the portions.

The button cell may have a fixed winding core in the center of the winding, the winding core at least partially filling the cavity in the center of the winding. Such a winding core fixes the electrode winding in radial direction and prevents a possible implosion of the winding into the axial cavity. Besides that, such a winding core also improves the stability of the button cell against external mechanical influences. Generally, damage of the electrode winding in the button cell by an external mechanical load in the axial direction is no longer possible.

Preferably, the electrode winding is a spiral or helical electrode winding. The mentioned axial cavity in the center of the winding may preferably have a substantially cylindrical configuration (in particular circle-cylindrical). On the shell side, it is limited by the winding. On the end face side it is limited by the corresponding faces of the bottom or the lid region of the button cell housing.

Correspondingly, the winding core contained in our button cell is preferably configured as a cylinder, in particular as a hollow cylinder. The height of such a cylinder preferably corresponds to the respective distance from the planar bottom region to the planar lid region parallel thereto.

It is particularly preferred that the winding core is made of a metal such as stainless steel or made of plastic.

Preferably, in the button cell, the negative electrode and the positive electrode are arranged offset to one another in the winding-shaped electrode-separator assembly within the assembly. An offset arrangement is to be interpreted to mean that the electrodes are arranged such that in the button cell in each case a different distance of the electrodes to the planar bottom and lid region results. In the most simple case, for example, a positive and a negative electrode can be applied on opposing sides of a separator sheet in the form of strips having the same width which are slightly offset to one another so that the distance of the positive electrode to the upper separator edge is greater than the comparable distance as measured from the negative electrode. Of course, the reverse applies in view of the distance to the lower separator edge.

As a result of the offset arrangement, electrodes of one polarity can, for example, directly abut a diverter assigned thereto and configured as a flat layer between the inner face of one of the housing halves and an end face side of the electrode winding.

It is particularly preferred that the preferably spiral winding of the button cell is heat-treated on its end face sides prior to installation. In doing so, it is exposed to a temperature at least for a short term, where the separator in the winding can be deformed thermoplastically. In general, the separator slightly protrudes from the end face sides of the winding, even under the condition that the electrodes are arranged to one another with the offset described. With the heat treatment, the separator can slightly shrink up.

The button cell is particularly a button cell without a flanging, as mentioned above. Correspondingly, exclusively a preferably force-fit connection exists in axial direction between the housing halves. Thus, the button cell preferably does not comprise a flanged cup edge as it is usually always the case with the known button cells. The button cell is closed without flanging. The interconnection of the housing halves is preferably ensured essentially by adhesive force only.

To produce our button cell without a flanging having a housing composed of a cell cup and a cell lid, a preferred procedure is in such a way that initially a sealing is applied to the shell region of a cell lid.

The cell cups and cell lids employed usually comprise in each case a bottom or a lid region, a shell region, a border region arranged between the bottom or lid region and the shell region, and a cut edge. Both bottom and lid region are essentially configured in a planar configuration, in general, later on they form the poles where the current uptake is effected by an electrical load. In the completed button cell, the bottom region of the cell cup and the lid region of the cell lid are oriented to be essentially parallel to one another. In contrast, in the completed button cell, the shell regions of the cell cup and the cell lid are preferably oriented essentially orthogonal in relation to the bottom or lid region and essentially have a cylindrical geometry. Preferably, the inner and outer radius of the cell cup and the cell lid are essentially constant in the shell regions. The above mentioned border regions of the cell cup and the cell lid form a transition between the shell regions and the lid region or the bottom region. Thus, on the one hand, they are limited by the bottom regions or lid regions configured in essentially planar configuration and, on the other hand, by the essentially cylindrical shell regions arranged orthogonal relative thereto. The border regions can be configured, for example, as a sharp edge or they can also be configured in a rounded shape.

Then, in a further step, the cell lid having the applied sealing is inserted into the cell cup so that a region is formed where the shell regions of the cell cup and the cell lid overlap. The size of the overlapping region or of the ratio between the overlapping region and the non-overlapping region is therein determined by the respective height of the shell regions of the cell cup and the cell lid as well as by the insertion depth. With regard to the shell region of the cell lid, it is preferred that 20% to 99%, in particular 30% to 99%, particularly preferred 50% to 99%, overlap with the shell region of the cell cup (the percentages in each case refer to the height of the shell or the shell region). Prior to insertion, the rest of the commonly used components of a button cell (electrodes, separator, electrolyte and the like) can be inserted into the cell cup and/or the cell lid. After the complete insertion of the cell lid into the cell cup, a pressure is exerted on the shell region of the cell cup, in particular in the region of the cut edge to seal the housing. The housing parts connected shall therein be subject to no or only very slight loads in axial direction, if possible. Therefore, the pressure is exerted in particular radially. Apart from the previously mentioned sealing of the housing, that way also the outer diameter of the cell housing can be calibrated.

It is particularly important that the heights of the shell regions of the cell cup and the cell lid are adapted to one another such that the cut edge of the cell cup is pressed against the shell region of the cell lid by the pressure onto the shell region of the cell cup. Namely, the heights of the shell regions are preferably selected such that a bending of the cut edge of the cell cup inwardly over the border region of the cell lid which is completely inserted into the cell cup is not possible. Correspondingly, flanging of the edge of the cell cup over the edge region of the cell lid is not effected. As a result, the cell cup of a button cell comprises, if applicable, a shell region having an essentially constant radius in the direction of the cut edge.

To produce button cells without a flanging, it is particularly preferred to use a cell cup which is conically configured at least in a portion of its shell so that at least its inner diameter in the direction of the cut edge increases. Thereby, inserting the cell lid into the cell cup is facilitated significantly. The dimensions of the cell cup and the cell lid are preferably adapted to one another such that higher counter forces preferably occur only when the lid is nearly completely inserted into the cup. Preferably, the cone angle is 10 minutes to 3 degrees, 30 minutes to 1 degree 30 minutes.

Preferably, the cell lid which has a sealing applied and which is introduced into the cell cup is cylindrically at least in a part of the shell region. If applicable, this applies in particular to the part of the shell region that overlaps with the above mentioned conically configured portion of the cell cup shell after the insertion of the cell lid into the cell cup. Particularly preferably, the shell of the cell lid and thus also the shell region is entirely cylindrically configured. Preferably, the cell lid thus comprises a constant outer radius in the shell region. If applicable, this applies particularly to the part that overlaps with the conically configured part of the shell region of the cell cup after the insertion of the cell lid.

When inserting a cell lid having a cylindrical shell region into a cell cup which is cylindrically at least in a portion of its shell, as described, usually a slot is formed between the cell cup and the cell lid opening in the upward direction. The slot is usually removed again by the pressure applied to the shell region of the cell cup. Namely, the pressure on the shell region of the cell cup is selected such that the conically configured part of the shell region of the cell cup is pressed inwardly, until the inner face of the cell cup and the outer face of the cell lid are spaced apart from one another in an essentially equal distance in the overlapping region. The resulting button cell comprises shell regions oriented to one another in a parallel manner, in particular in the overlapping region.

An important aspect therein is the selection of the sealing to connect the cell cup to the cell lid. Preferably, the sealing is a plastic sealing made from a thermoplastic material.

Particularly preferably, plastic seals are used, in particular plastic foils based on polyamide or based on polyetheretherketones.

Preferably, the sealing of a cell without flanging has an initial thickness of 50 μm to 250 μm. The term "initial thickness" shall therein refer to the thickness of the sealing provided prior to its application to the shell of the cell lid. In contrast, the term "end thickness" shall refer to the thickness of the sealing in the completed cell. It is clear that in general this one corresponds to the distance between the inner face of the cell cup and the outer face of the cell cup at least in the overlapping region.

As to allow a sufficiently high friction between the cell cup and the cell lid, both the outer and the inner radiuses of the cup and of the lid should be adapted to one another as well as to the thickness of the foil sealing. Only in this manner, a sufficiently high contact pressure can develop to hold the individual parts together. Preferably, it applies to the parts used therein that the difference between the outer radius of the cell lid to be inserted into the cell cup on the cut edge of the cell lid and the smallest inner radius of the cell cup in the part of the shell region overlapping with the shell region of the cell lid is smaller than the initial thickness of the sealing used. Preferably, the difference is 10% to 90% of the initial thickness.

After insertion of the cell lid into the cell cup, a part of the shell region of the cell cup can be radially drawn inwardly. This applies particularly to the part of the shell region that does not overlap with the shell region of the cell lid.

The drawing-in can be effected at the same time as the above mentioned exertion of pressure on the shell region of the cell cup, however, the drawing-in is preferably effected in a subsequent separate step.

Preferably, the button cell is a conventional button cell having a circular, planar bottom region and a circular, plane lid region. However, in some cases, the button cell can also have an oval configuration, for example. However, it is to be considered that the ratio of height to diameter is preferably always less than 1. In the button cell it is particularly preferred 0.1 to 0.9, in particular 0.15 to 0.7. A height shall therein refer to the shortest distance between the planar bottom region and the planar lid region parallel thereto. A diameter refers to the maximum distance of two points on the shell region of the button cell.

The indicated advantages as well as further advantages particularly also result from the following description of the drawings. Individual features can be realized on their own or in a combination thereof. The examples described merely serve for explanation and for a better understanding and do in no way have a limiting character.

In FIG. 1B shows the housing 101 of a button cell without flanging and, in comparison, FIG. 1A shows the housing of a button cell having a flanged cup edge. Both the housing of a conventional button cell and the housing of the button cell without flanging in each case are composed of a cell cup 102 and a cell lid 103. These are in each case connected to one another via a seal 104. While in case of the conventional button cell, the opening edge of the cell cup 102 is flanged inwards over the edge of the cell lid 103, this is not the case for the housing 101 of the button cell without flanging.

As can well be seen, in case of the housing 101 of the button cell without flanging, shell regions 102b and 103b of the cell lid 103 and of the cell cup 102 overlap, whereby the overlapping region 105 is formed. The inner radius of the cell cup 102 in the overlapping region 105 is essentially constant up to the cut edge 102d. Thus, the housing 101 of a button cell without flanging does not have a cup edge that is flanged inwardly as is the case with the conventional button cell in FIG. 1A. The cut edge 102d of the cell cup 102 lies against the outer face of the cell cup 103 in the shell region 103b.

The cell cup 102 comprises the essentially planar bottom region 102a, the essentially cylindrically configured shell region 102b and the border region 102c. The cut edge 102d forms the opening edge of the cell cup 102.

The cell lid 103 comprises the essentially planar bottom region 103a, the essentially cylindrically configured shell region 102b and the edge region 103c. The cut edge 103d forms the opening edge of the cell cup 103.

The border region 102c is configured as a sharp edge while the border region 103c forms a comparatively flattened transition between the lid region 103a and the shell region 103b. While in case of conventional button cells, such a flattened transition was required to facilitate flanging of the edge of the cell lid 103, it can be dispensed with in case of a button cell without flanging. So it is possible to configure the region 103c as a sharp edge as well. On one side, the border region 103c is limited on the line 103e by the essentially planar lid region 103a and on the other side it is limited on the line 103f by the peripheral, essentially cylindrically configured shell region 103b which is oriented orthogonally in relation to the essentially planar lid region 103a.

Furthermore, the region 106 is shown where the shell region 102b of the cell cup 102 not overlapping the shell region 103b of the cell lid is drawn inwardly. The outer radius of the shell of the cell cup 102 in the region 106 is correspondingly smaller than the outer radius of the shell in the overlapping region 105.

Figure 2:
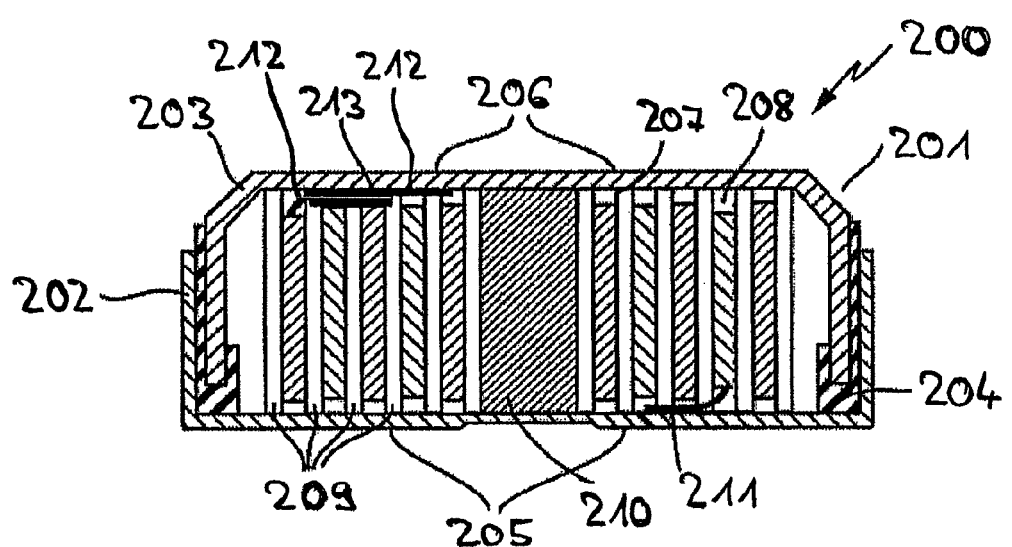
FIG. 2 schematically shows the cross section of a preferred example of a button cell having a housing without flanging as shown in FIG. 1B.

FIG. 2 schematically shows the cross-section of a preferred example of a button cell 200.

The cell comprises a housing 201 composed of a metal cell cup 202 and a metal cell lid 203. Both parts connect to one another in a sealing manner by a seal 204. Together they form a housing having a planar bottom region 205 and a planar lid region 206 parallel thereto. In the operational state, these planar regions 205 and 206 form the poles of the button cell, where a current uptake can be effected by an electrical load.

The cell lid 203 is inserted into the cell cup 202 so that the shell regions of the cell lid and the cell cup overlap, wherein the inner radius of the cell cup 202 is essentially constant in the overlapping region in the direction of the cut edge. Thus, the edge of the cell cup 202 is not flanged over the edge of the cell lid 203.

An assembly composed of a strip-shaped electrode 207, a strip-shaped electrode 208 and the strip-shaped separators 209 are arranged in the interior of the electrode. The assembly composed of the electrodes 207 and 208 as well as the separators 209 is present in the type of a winding whose face sides are oriented in the direction of the planar bottom region 205 and the planar lid region 206 parallel thereto. The assembly is wound up on the winding core 210 in the center of the button cell 200. Both the core 210 and the electrodes and separators wound around the core are oriented orthogonal in relation to the planar bottom and lid regions 205 and 206. As far as the electrodes gain or lose volume during a charging or discharging procedure, the mechanical forces resulting predominantly act radially and can be absorbed by the shell region of the button cell 200.

The positive and the negative electrodes are contacted to the cup and lid housing halves via a diverter 211 and a diverter 212. Both diverters are thin foils lying flat between the end face sides of the winding and the planar lid or bottom regions 205 and 206. Due to the winding core 211, a constant slight contact pressure on the diverters is maintained. The diverters are preferably separated from the end face sides of the winding by a separate insulator element (not shown in the drawing), for example, by a thin foil.

The thermal fuse 213 is integrated into the diverter 212. The fuse is welded into the diverter to reliably interrupt any charging or discharging procedure as soon as its activation temperature is surpassed. The fuse is preferably an irreversible fuse.

The invention claimed is:

1. A button cell closed without flanging comprising:
   a housing formed of two housing halves comprising a cell cup and a cell lid,
   an electrically insulating seal separating the cell cup and the cell lid,
   an electrode-separator assembly comprising at least one positive electrode and at least one negative electrode arranged inside the housing,
   metal foil diverters electrically connecting the at least one positive electrode and the at least one negative electrode to the housing halves, and
   a thermal fuse integrated into one of the metal foil diverters or arranged between a current collector of one of the electrodes and a metal foil diverter connecting the electrode to the housing,
   wherein
   the cell cup comprises a bottom region, a shell region, a border region arranged between the bottom region and the shell region, and a cut edge,
   the cell lid comprises a lid region, a shell region, a border region arranged between the lid region and the shell region, and a cut edge,
   the cell lid is inserted into the cell cup,
   the shell region of the cell cup has a substantially constant radius in a direction of the cut edge,
   the housing formed by the cell cup and the cell lid has a substantially planar bottom region and a substantially planar lid region substantially parallel thereto,
   the electrode-separator assembly is configured as a spiral winding and is positioned in the housing such that end face sides of the electrode-separator assembly are oriented in a direction of the substantially planar bottom region and the substantially planar lid region, and
   the metal foil diverters form a flat layer between an inner face of the housing halves and the end face sides of the electrode-separator assembly.

2. The button cell according to claim 1, wherein the thermal fuse is a reversibly triggering or an irreversibly triggering fuse.

3. The button cell according to claim 1, wherein the thermal fuse has a nominal activation temperature of 65° C. to 130° C. and/or a holding temperature of 60° C. to 70° C. measured at a nominal current of 5 C A according to IEC 61960-1.

4. The button cell according to claim 1, wherein the thermal fuse is a melt fuse based on Rose Metal and/or D'Arcet Metal.

5. The button cell according to claim 1, wherein the thermal fuse is a positive temperature coefficient element.

6. The button cell according to claim 2, wherein the thermal fuse has a nominal activation temperature of 65° C. to 130° C. and/or a holding temperature of 60° C. to 70° C. measured at a nominal current of 5 C A according to IEC 61960-1.

7. A button cell comprising:
   two metal housing halves separated from one another by an electrically insulating seal and which form a housing having a substantially planar bottom region and a planar lid region parallel thereto,
   an electrode-separator assembly having at least one positive electrode and at least one negative electrode within the housing, wherein the electrode-separator assembly is configured as a spiral winding and is positioned in the housing such that end face sides of the electrode-separator assembly are oriented in a direction of the substantially planar bottom region and the substantially planar lid region, and
   metal foil diverters which electrically connect the at least one positive and the at least one negative electrode to in each case one of the housing halves, and
   a thermal fuse integrated into at least one of the metal foil diverters or arranged between a current collector of one of the electrodes and a metal foil diverter connecting the electrode to the housing,
   wherein the metal foil diverters form a flat layer between an inner face of the housing halves and the end face sides of the electrode-separator assembly.

* * * * *